(12) United States Patent
Shimizu

(10) Patent No.: US 11,855,889 B2
(45) Date of Patent: Dec. 26, 2023

(54) INFORMATION PROCESSING DEVICE, INFORMATION PROCESSING METHOD, AND COMPUTER-READABLE MEDIUM OF PROVIDING DUMMY RESPONSE WHEN MEMORY SEARCH IS UNNECESSARY

(71) Applicant: FUJITSU LIMITED, Kawasaki (JP)

(72) Inventor: Takashi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/485,558

(22) Filed: Sep. 27, 2021

(65) Prior Publication Data

US 2022/0224641 A1  Jul. 14, 2022

(30) Foreign Application Priority Data

Jan. 8, 2021  (JP) .................................. 2021-002189

(51) Int. Cl.
*H04L 45/586*  (2022.01)

(52) U.S. Cl.
CPC .................. *H04L 45/586* (2013.01)

(58) Field of Classification Search
CPC .......................... H04L 12/4641; H04L 45/586
See application file for complete search history.

(56) References Cited

U.S. PATENT DOCUMENTS

| 5,603,006 A | * | 2/1997 | Satake | G06F 12/1045 |
| | | | | 711/E12.047 |
| 2006/0002386 A1 | | 1/2006 | Yik et al. | |
| 2006/0190667 A1 | * | 8/2006 | Drehmel | G06F 13/4027 |
| | | | | 710/315 |
| 2010/0306211 A1 | | 12/2010 | Chaudhuri et al. | |
| 2014/0365632 A1 | | 12/2014 | Ishii et al. | |
| 2017/0357512 A1 | * | 12/2017 | Landers | G06F 9/3836 |
| 2018/0191629 A1 | * | 7/2018 | Biederman | H04L 69/22 |

FOREIGN PATENT DOCUMENTS

| EP | 2926251 A1 | 10/2015 |
| WO | 2014/103144 A1 | 7/2014 |

OTHER PUBLICATIONS

Extended European Search Report dated Mar. 10, 2022 for corresponding European Patent Application No. 21198966.0, 8 pages.

* cited by examiner

*Primary Examiner* — Benjamin Lamont
(74) *Attorney, Agent, or Firm* — Fujitsu Patent Center

(57) ABSTRACT

An information processing method includes: receiving a request for search with respect to a memory circuit that searches for information stored in a memory, issued from a requester; storing order information in which the request is issued; determining whether or not to make the memory circuit perform search on the basis of a predetermined requirement not to make the memory circuit perform search and the request; creating a predetermined response in a case where the memory circuit is not made to perform search; and returning a response of the memory circuit and the predetermined response to the requester in the issued order on the basis of the order information.

5 Claims, 11 Drawing Sheets

| LABEL | DESTINATION |
|-------|-------------|
| A | $\alpha$ |
| B | $\beta$ |
| C | $\gamma$ |
| D | $\delta$ |

| INPUT | DESTINATION | DESTINATION PORT | ACTION |
|---|---|---|---|
| $\delta$ | $\alpha$ | 22 | forward, IP-NAT |
| $\delta$ | $\beta$ | 3333 | forward |
| $\delta$ | $\alpha$ | 4096 | drop |
| $\delta$ | $\gamma$ | 22 | forward, IP-NAT |

INFORMATION PROCESSING DEVICE, INFORMATION PROCESSING METHOD, AND COMPUTER-READABLE MEDIUM OF PROVIDING DUMMY RESPONSE WHEN MEMORY SEARCH IS UNNECESSARY

CROSS-REFERENCE TO RELATED APPLICATION

This application is based upon and claims the benefit of priority of the prior Japanese Patent Application No. 2021-2189, filed on Jan. 8, 2021, the entire contents of which are incorporated herein by reference.

FIELD

The embodiment discussed herein is related to an information processing device, an information processing method, and a non-transitory computer-readable storage medium storing an information processing program.

BACKGROUND

A router is a network device that controls a route of data between different networks, At a portion of an exit of the network, the router to be a connection port to another network generally exists. Usual routers are generally network devices implemented by hardware. However, in recent years, a virtual router (vRouter) that is a virtual router implemented by software has been increasingly used. The virtual router may be referred to as a software vRouter.

The virtual router is software that resolves a destination by connecting between virtual machines as a router resolves a destination by connecting between servers. The virtual router generally searches a large number of tables and resolves the destination.

Here, each of the router and the virtual router includes a control plane and a data plane. The control plane has a function for configuring and controlling a network. The control plane sets, for example, a combination of an Internet protocol (IP), a port number, and a destination as a flow. The data plane has a function for transferring data. The data plane, for example, analyzes content of an input packet and performs hash (hash) calculation same as the control plane so as to access the corresponding entry in a plurality of flows set by the control plane and specify a destination.

There is a technology referred to as software defined network (SDN) as a technology using the virtual router. The SDN is a technology for forming a virtual network with software. As the SDN, for example, OpenFlow that is a technology for centrally managing a configuration and control of a network with software or the like attract attention. To use the SDN, many virtual routers adopt an architecture in which a control plane and a data plane are separated. However, the data plane implemented by software occupies a large amount of resources of a central processing unit (CPU). Therefore, research is advanced that offloads the data plane of the software to a field programmable gate array (FPGA) or the like.

Here, an example of packet transmission processing by a virtual router will be described. Here, a case will be described where, when an internal network and an external network exist and a packet is transmitted to the external network, a transmission destination address of the packet is changed. For example, the internal network is a network that connects computers in a company, and the external network is a network that connects to a computer of another company.

When receiving the packet, the virtual router acquires a label from the packet. Next, the virtual router acquires a destination corresponding to the label from a label table of the virtual router. Next, the virtual router refers to a flow table and specifies an action corresponding to the destination. The action is information representing whether or not to change an address, and in a case where the address is changed, the changed address is also designated. In other words, for example, the virtual router can recognize whether or not to change an address for a specific destination by using the flow table and can specify the changed addresses of a transmission source and a transmission destination in a case where the address is changed. By changing the address in this way, it is possible to keep information in the company confidential from outside.

Here, in a case where the address is not changed, the virtual router does not acquire new information used for packet transmission processing executed according to the determination of the action. Therefore, in a case where the address of the transmission destination is not changed, it is considered that the virtual router omits the specification of the action using the flow table. However, in a case where the specification of the action using the flow table is simply omitted, it is considered that information such as a destination notified according to the specification of the action does not match an order of a payload to be transmitted. Therefore, a usual virtual router acquires a dummy response as an action specification result even in a case where the address of the transmission destination is not changed so that the information such as the destination does not differ from the order of the payload to be transmitted.

Furthermore, a technology for controlling an order of a packet includes related art that performs control to store response headers so that the response headers are read in a first order in which request headers are received and to read the response headers in a second order when request data is transmitted in a second order.

Examples of the related art include as follows: International Publication Pamphlet No, WO 2014/103144.

SUMMARY

According to an aspect of the embodiments, an information processing method includes: receiving a request for search with respect to a memory circuit that searches for information stored in a memory, issued from a requester; storing order information in which the request is issued; determining whether or not to make the memory circuit perform search on the basis of a predetermined requirement not to make the memory circuit perform search and the request; creating a predetermined response in a case where the memory circuit is not made to perform search; and returning a response of the memory circuit and the predetermined response to the requester in the issued order on the basis of the order information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a label table;

DESCRIPTION OF EMBODIMENTS

However, in the usual virtual router, a dummy entry in a case where the address is not changed is written to the flow table so as to return a dummy response in a case where the address is not changed and the dummy entry is referred at the time when a packet is transmitted to a destination. With such a configuration, a memory bandwidth is wasted, and this may be a bottleneck of a performance of the virtual router.

Furthermore, the related art that stores a receiving order of the request headers and changes a calling order of the response headers to a data transmission order in a case where the data transmission order is different does not include a storage unit that stores conditions used to determine whether or not to search a memory and a determination circuit that makes determinations. Therefore, with this related art, it is difficult to realize the omission of the dummy response, and it is difficult to reduce deterioration in the performance caused by the waste of the memory bandwidth.

The disclosed technology has been made in consideration of the above, and an object is to provide an information processing device, an information processing method, and an information processing program that improve a communication performance.

Embodiments of an information processing device, an information processing method, and an information processing program disclosed in the present application will be described in detail below with reference to the drawings. Note that the following embodiment does not limit the information processing device, the information processing method, and the information processing program disclosed in the present application.

EMBODIMENTS

Figure 1:
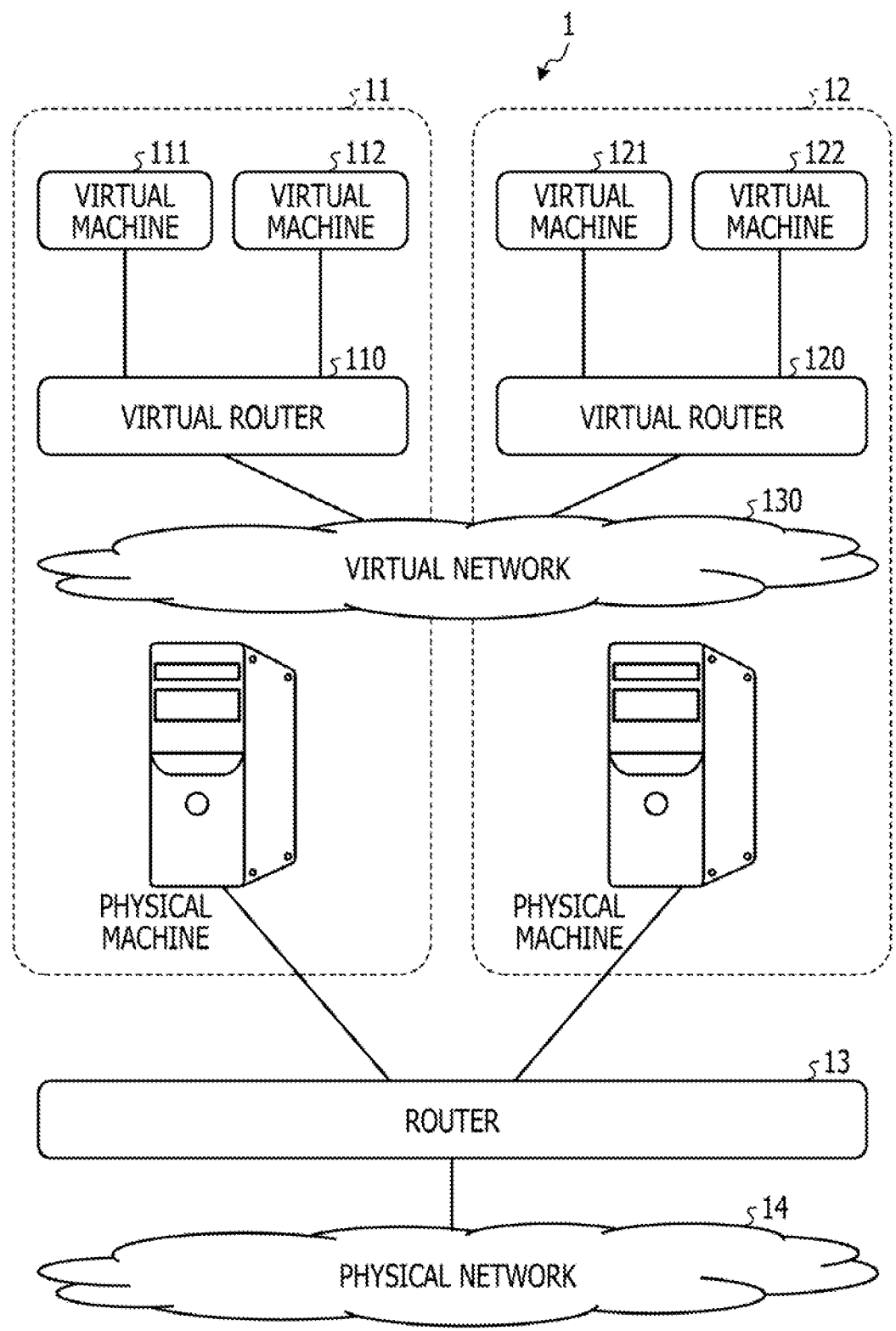
FIG. 1 is a system configuration diagram illustrating an information processing system using a virtual router.

FIG. 1 is a system configuration diagram illustrating an information processing system using a virtual router. An information processing system 1 includes physical machines 11 and 12. The physical machines 11 and 12 are connected with a router 13 that is a hardware device. The router 13 is connected to a physical network 14. The router 13 can be considered as a part of the physical network 14.

In the physical machine 11, virtual machines 111 and 112 operate. Then, the virtual machines 111 and 112 are connected to a virtual router 110. In the physical machine 12, virtual machines 121 and 122 operate. Then, the virtual machines 121 and 122 are connected to a virtual router 120.

The virtual routers 110 and 120 are connected to a virtual network 130 and can mutually transmit and receive packets. The virtual routers 110 and 120 can be considered as a part of the virtual network 130. Because both of the virtual routers 110 and 120 have a similar function, the virtual router 110 will be described below as an example.

Figure 2:
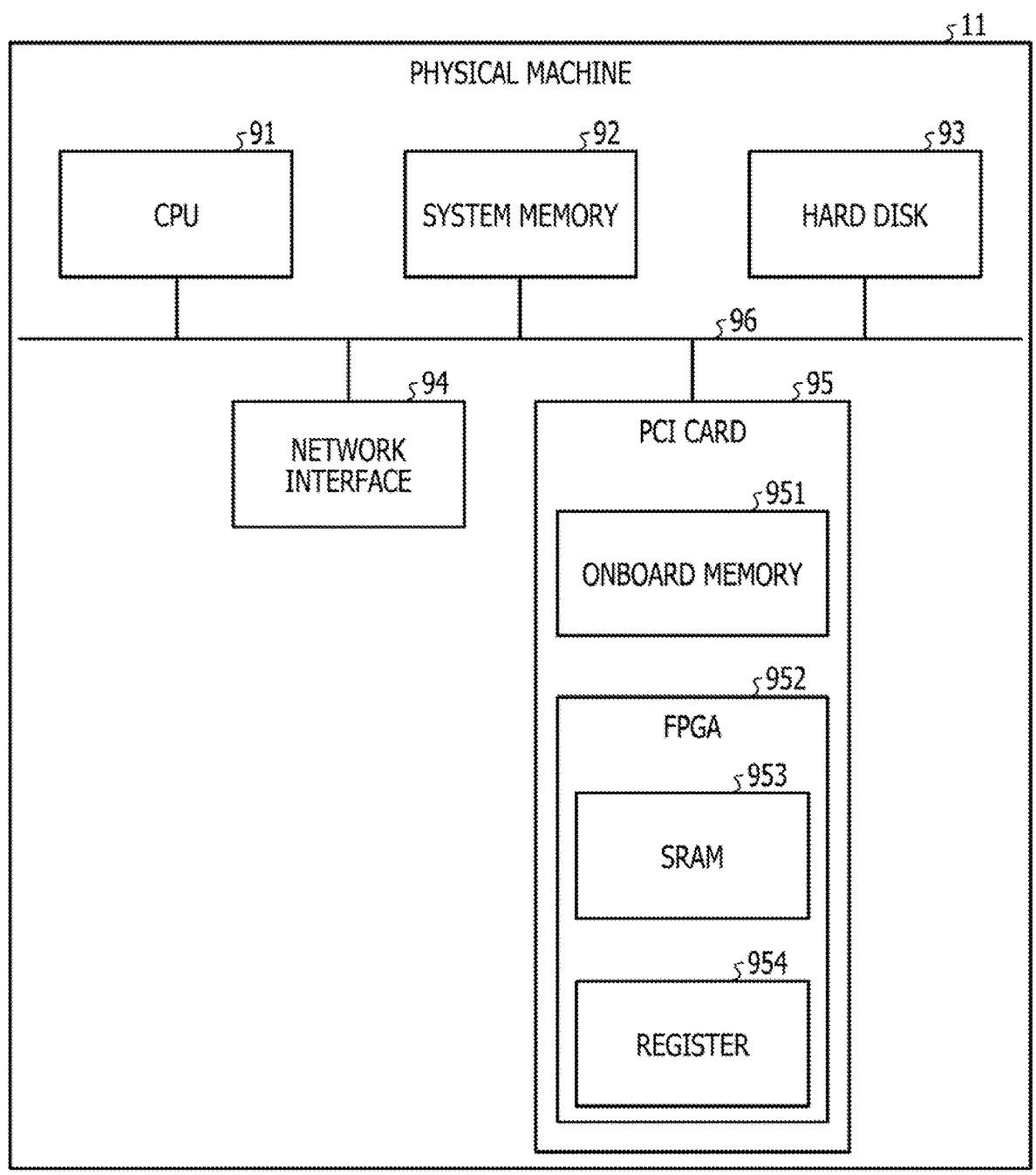
FIG. 2 is a diagram illustrating an example of a hardware configuration of a physical machine.

FIG. 2 is a diagram illustrating an example of a hardware configuration of a physical machine. For example, as illustrated in FIG. 2, the physical machine 11 includes a CPU 91, a system memory 92, a hard disk 93, a network interface 94, and a peripheral component interconnect (PCI) card 95.

The CPU 91 is connected to each of the system memory 92, the hard disk 93, the network interface 94, and the PCI card 95 by a bus 96. The hard disk 93 stores various programs that operate applications or the like. The CPU 91 develops various programs stored in the hard disk 93 on the system memory 92 and executes the programs so as to operate applications such as the virtual machines 111, 112, and the like.

The PCI card 95 includes an onboard memory 951 and a field programmable gate array (FPGA) 952. The FPGA 952 includes a SRAM 953 and a register 954. This sequence of the system memory 92, the onboard memory 951, the SRAM 953, and the register 954 is an ascending order of a capacity and also is a descending order of a speed.

Figure 3:
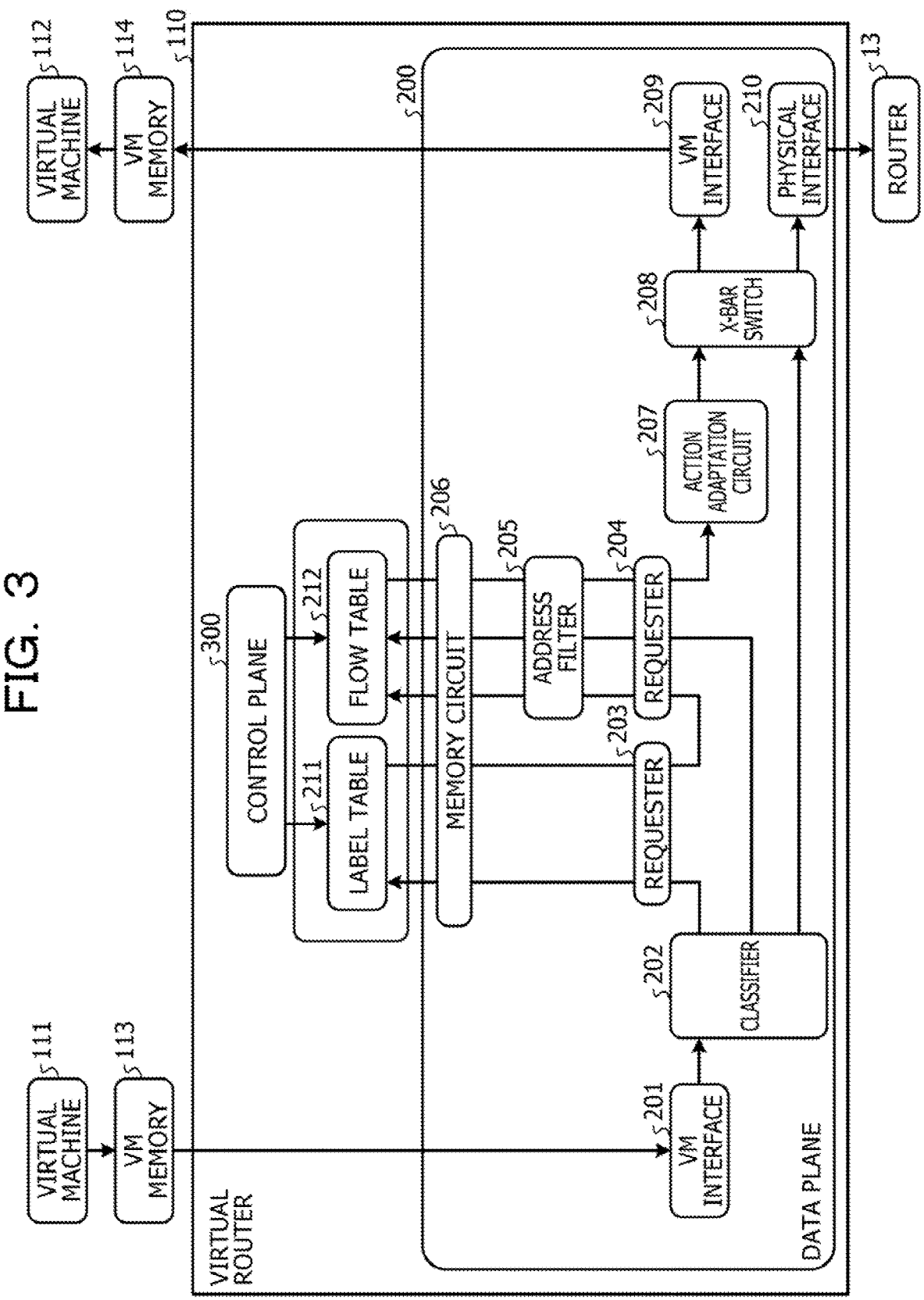
FIG. 3 is a block diagram of the virtual router.

The virtual router 110 is implemented by the CPU 91, the system memory 92, the network interface 94, and the PCI card 95 in FIG. 2. FIG. 3 is a block diagram of a virtual router.

As illustrated in FIG. 3, the virtual router 110 includes a data plane 200 and a control plane 300. The data plane 200 has a function for controlling packet transfer and is implemented by the FPGA 952 in FIG. 2. On the other hand, the control plane 300 has a function for managing a flow and is implemented by the CPU 91 and the system memory 92. The flow is a set of communications having the same rules such as "communication having the same destination port" or "communication having the same destination Internet protocol (IP) address".

The data plane 200 includes a virtual machine (VM) interface 201, a classifier 202, a requester 203, a requester 204, an address filter 205, and a memory circuit 206. Moreover, the data plane 200 includes an action adaptation circuit 207, an X-bar switch 208, a VM interface 209, and a physical interface 210. Furthermore, the data plane 200 includes a label table 211 and a flow table 212. The data plane 200 that occupies a large amount of resources of the CPU is implemented by the FPGA 952 in the present embodiment. However, there is a case where the label table 211 and the flow table 212 are arranged in the system memory 92 or the onboard memory 951. In FIG. 3, the label table 211 and the flow table 212 are surrounded by a frame so as to indicate that the label table 211 and the flow table 212 are a part of the data plane 200.

The virtual machine 111 sequentially transmits packets to a destination. The packet transmitted from the virtual machine 111 is temporarily stored in the VM memory 113 having a buffer function.

The VM interface 201 sequentially acquires each of the packets stored in the VM memory 113. Then, the VM interface 201 outputs the acquired packet to the classifier 202.

The classifier 202 receives inputs of the packets from the VM interface 201. Next, the classifier 202 separates the packet into a label, input source information, a header, and a payload. The label is a label used for multi protocol label switching (MPLS) and is information that is uniquely associated with an IP address. Then, the classifier 202 outputs the label of each packet to the requester 203. Furthermore, the classifier 202 obtains a hash value of the header of each packet and outputs the hash value of the header and the input source information to the requester 204. Here, the hash value of the header is a value calculated by using a hash function with respect to a transmission source IP address, a destination IP address, a transmission source port, a destination port, protocol information, or the like included in the header. Here, the hash calculation performed by the classifier 202 is calculation same as hash calculation used when the control plane 300 calculates data to be registered in the flow table 212. Moreover, the classifier 202 outputs the payload of each packet to the X-bar switch 208.

The requester 203 receives an input of the label. Next, the requester 203 generates a request for a destination inquiry used to inquire information regarding a destination corresponding to the acquired label. Then, the requester 203 outputs the generated request for destination inquiry to the memory circuit 206.

Thereafter, the requester 203 receives an input of the information regarding the destination corresponding to the inquired label to the memory circuit 206 as a response to the request for the destination inquiry. Then, the requester 203 outputs the acquired information regarding the destination to the requester 204.

FIG. 4 is a diagram illustrating an example of a label table. As illustrated in FIG. 4, a destination corresponding to a label is registered in the label table 211. If the size of the label table 211 is small, the label table 211 is arranged in the register 954 or the SRAM 953. However, in a case where the number of entries increases and the data size increases, the label table 211 is arranged in the onboard memory 951 or the system memory 92.

Each entry is registered in the flow table 212 by the control plane 300. In the flow table 212, the control plane 300 registers the hash value calculated by using the hash function with respect to the transmission source IP address, the destination IP address, the transmission source port, the destination port, and the protocol information together with the input source information and the information regarding the destination. As a result, a flow obtained by combining pieces of information such as an IP, a port number, and a destination is set to the flow table 212. This flow table 212 corresponds to an example of "specific information" that is "information stored in a memory". Then, the register 954 and the SRAM 953 that store the flow table 212 correspond to an example of a "memory".

Figure 5:
FIG. 5 is a diagram illustrating an example of a flow table.

FIG. 5 is a diagram illustrating an example of a flow table. In the flow table 212, input source information, information regarding a destination, information combining an IP and a port number, and an action to be executed are registered in association with each other. In FIG. 5, the information combining the IP and the port number is represented by hash values of various types of communication information included in the header in practice. In FIG. 5, the destination port is illustrated as an example of the information included in the hash value of the header. The action is information representing what type of communication processing is executed on the packets of which the input source information, the information regarding the destination, and the destination port match. For example, IP-network address translation (NAT) is IP address conversion processing for converting a private IP address into a global IP address. The expression forward is packet transfer processing. The expression drop is packet discard processing. If the size of the flow table 212 is small, the flow table 212 is arranged in the register 954 or the SRAM 953. However, in a case where the number of entries increases and the size increases, the flow table 212 is arranged in the onboard memory 951 or the system memory 92.

Returning to FIG. 3, the description will be continued. The memory circuit 206 accesses each memory of the system memory 92, the onboard memory 951, the SRAM 953, and the register 954 and writes and reads data. The memory circuit 206 operates in an out-of-order state.

The memory circuit 206 receives an input of the request for the destination inquiry from the requester 203. Then, the memory circuit 206 refers to the label table 211 and acquires information regarding a destination corresponding to the label designated by the request. For example, in a case where the label table 211 illustrated in FIG. 4 is used, the memory circuit 206 acquires α as the information regarding the destination when the label is A. Thereafter, the memory circuit 206 outputs the acquired information regarding the destination to the requester 203 as a response to the request for the destination inquiry.

Furthermore, the memory circuit 206 acquires a request for an action inquiry from the address filter 205 to be described later. Next, the memory circuit 206 refers to the flow table 212 and specifies an entry that matches input source information, destination information, and input port information designated by the request. Then, the memory circuit 206 acquires information regarding an action registered in the specified entry. Thereafter, the memory circuit 206 outputs the acquired action to the address filter 205 as a response to the request for the action inquiry. Here, because the memory circuit 206 operates in the out-of-order state, there is a case where an order of the input request is different from an order of information regarding the output action.

The requester 204 receives the inputs of the hash value of the header and the input source information of each packet from the classifier 202. Furthermore, the requester 204 receives the input of the information regarding the destination corresponding to the label of each packet from the requester 203. Next, the requester 204 generates a request for an action inquiry used to inquire information regarding the action to be executed on each packet using the input source information, the destination information, and the acquired hash value of the header. Then, the requester 203 outputs the generated request for the action inquiry to the memory circuit 206. This request for the action inquiry corresponds to an example of a "memory request for search".

Thereafter, the requester 204 receives an input of the information regarding the action to be executed on the packet from the memory circuit 206 as a response to the request for the action inquiry. Then, the requester 204 outputs the acquired information regarding the action to the action adaptation circuit 207.

The address filter 205 determines whether or not an action search is unnecessary for each packet. Then, the address filter 205 acquires an action by transmitting a request to the memory circuit 206 for the packet for which the action search is performed and generates a dummy response for the packet for which the action search is unnecessary. Thereafter, the address filter 205 returns a response to the request to the requester 204. This address filter corresponds to an example of a "control unit". Details of the address filter 205 will be described below.

Figure 6:
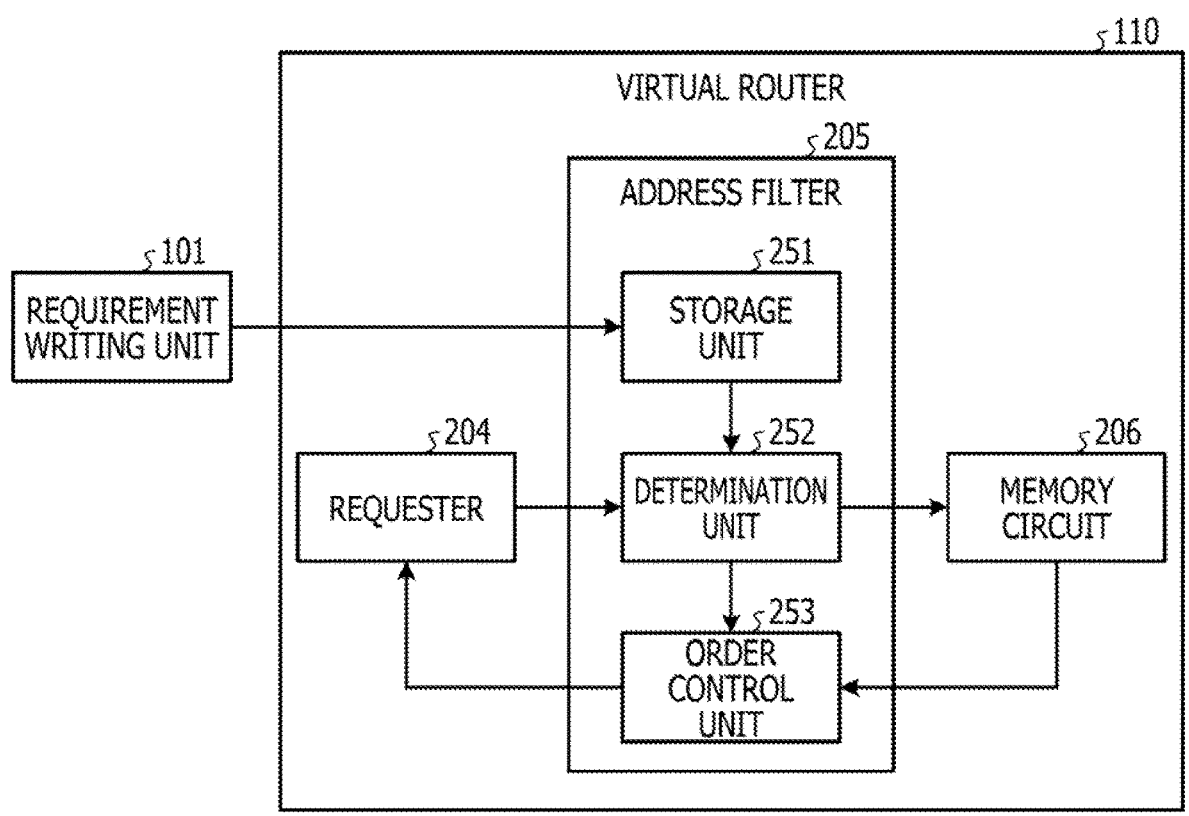
FIG. 6 is a block diagram illustrating details of an address filter.

FIG. 6 is a block diagram illustrating details of an address filter. In FIG. 6, functional units other than functional units related to the address filter 205 in the virtual router 110 are omitted. As illustrated in FIG. 6, the address filter 205 includes a storage unit 251, a determination unit 252, and an order control unit 253.

The storage unit 251 acquires predetermined requirements for specifying a packet for which action search is unnecessary from a requirement writing unit 101 that is implemented by executing an application by the CPU 91 and stores the acquired requirements. In the present embodiment, the storage unit 251 stores search unnecessary requirements such as IP rewrite is unnecessary in the same tenant. The predetermined requirements for specifying the packet for which the action search is unnecessary are not particularly limited as long as the requirement is a requirement that can identify the packet. For example, it is possible to use requirements such as prohibiting an access to an experimental network or transmitting an original packet to a monitoring server, as this requirement.

Figure 7:
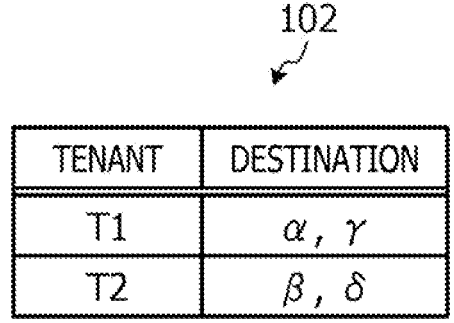
FIG. 7 is a diagram illustrating an example of determination information.

Moreover, the storage unit 251 acquires determination information used to determine whether or not the search unnecessary requirement is satisfied from the requirement writing unit 101 and stores the determination information. The storage unit 251 according to the present embodiment stores determination information 102 representing a destination for each tenant illustrated in FIG. 7. FIG. 7 is a diagram illustrating an example of the determination information. In the determination information 102, information regarding a destination of a computer that can receive a packet is registered for each tenant. For example, in the determination information 102 in FIG. 7, a computer of which destination information is a and a computer of which destination information is γ belong to the same tenant T1.

Returning to FIG. 6, the description will be continued. The determination unit 252 receives an input of the request for the action inquiry from the requester 204. Here, the determination unit 252 outputs order information representing an input order of the acquired request to the order control unit 253. For example, the determination unit 252 assigns a serial number to each request and notifies the number of the order control unit 253.

Next, the determination unit 252 analyzes the acquired request and acquires input source information and destination information. Then, the determination unit 252 refers to the requirements and the determination information 102 stored in the storage unit 251 and determines whether or not the packet satisfies the search unnecessary requirement. In a case of the present embodiment, in a case where the input source information and the destination information are registered as the destinations corresponding to the same tenant in the determination information 102, the determination unit 252 determines that the packet satisfies the search unnecessary requirement.

In a case where the packet does not satisfy the search unnecessary requirement, the determination unit 252 outputs the request for the action inquiry to the memory circuit 206.

On the other hand, in a case where the packet satisfies the search unnecessary requirement, the determination unit 252 outputs a predetermined response indicated by the search unnecessary requirement to the order control unit 253 as a response. For example, in the present embodiment, because it is unnecessary to rewrite an IP of the packet that satisfies the search unnecessary requirement and no action is performed, the determination unit 252 generates a dummy response as an action to be executed. Thereafter, the determination unit 252 outputs the dummy response to the order control unit 253 as an action to be executed on the packet.

The order control unit 253 acquires order information of each packet from the determination unit 252. Thereafter, regarding the packet that does not satisfy the search unnecessary requirement, the order control unit 253 acquires a response including the information regarding the action to be executed on the packet from the memory circuit 206. Furthermore, regarding the packet that satisfies the search unnecessary requirement, the order control unit 253 acquires the response including the dummy response from the determination unit 252.

The order control unit 253 waits until a response to a head packet of the order information is acquired. In a case where the response to the head packet of the order information is acquired, the order control unit 253 outputs the response to the requester 204 and deletes information regarding the head packet of the order information, Before processing on all the packets is completed, the order control unit 253 repeats the acquisition of the response, the output of the response to the head packet of the order information, and the deletion of the information. In other words, for example, the order control unit 253 returns the response of the memory circuit 206 and the predetermined response from the determination unit 252 to the requester 204 in a request issuance order.

Figure 8:
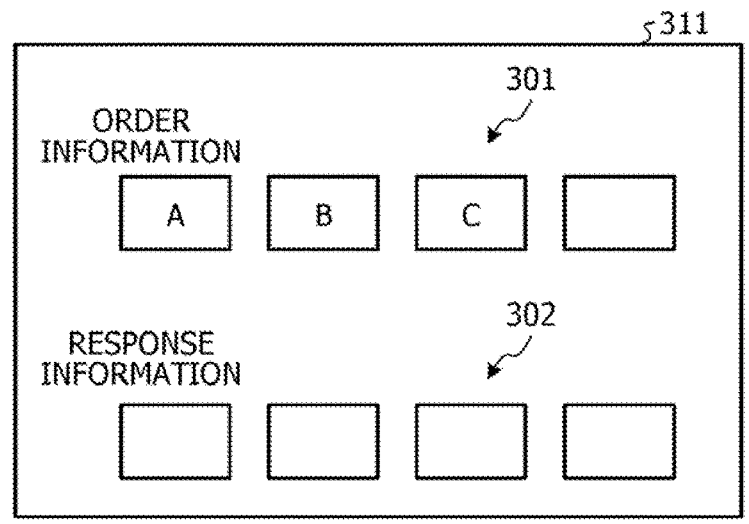
FIG. 8 is a diagram for explaining order control processing of an order control unit.
Figure 8:
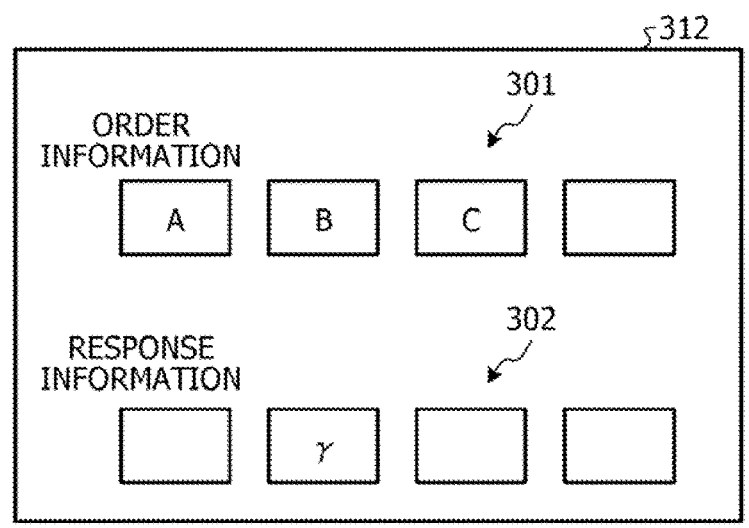
Figure 8:
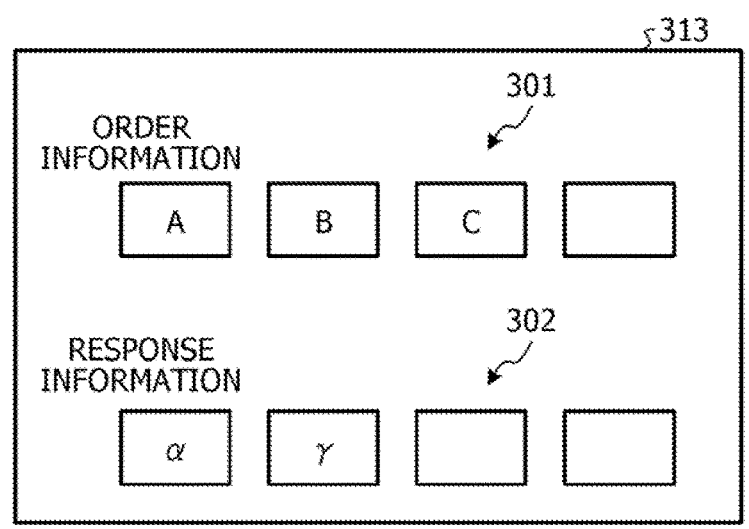

FIG. 8 is a diagram for explaining order control processing of an order control unit. The order control unit 253 acquires, for example, order information 301 represented by a label of a packet from the determination unit 252, Here, the order information 301 is acquired that represents an order such that a first packet has a label A, a next packet has a label B, and a final packet has a label C, as indicated by a state 311. At this stage, the order control unit 253 does not include response information 302.

Next, as indicated by a state 312, the order control unit 253 acquires γ that is a response of the packet with the label B as the response information 302. Because a response of the packet with the label A that is the head of the order information 301 is not acquired at this stage, the order control unit 253 does not output a response to the requester 204.

Next, as indicated by a state 313, the order control unit 253 acquires α that is a response of the packet with the label A as the response information 302. Because the response of the head packet of the order information 301 is acquired at this time, the order control unit 253 outputs α that is the response of the packet with the label A that is the head packet to the requester 204 as a response.

Thereafter, the order control unit 253 deletes information regarding the packet with the label A that is the head packet of the order information 301. In this case, because a head packet of next order information 301 is the packet with the label B and γ that is the response thereof has been already acquired, the order control unit 253 immediately outputs γ that is the response of the packet with the label B to the requester 204 as a response. Thereafter, the order control unit 253 deletes information regarding the packet with the label B that is the head packet of the order information 301. Then, the order control unit 253 waits until a response of the packet with the label C that is a head packet of next order information 301 is acquired.

Returning to FIG. 3, the description will be continued. The action adaptation circuit 207 receives an input of the information regarding the action to be executed on each packet from the requester 204. Moreover, the action adaptation circuit 207 receives an input of the input source information, the destination information, and the information regarding the header from the requester 204. Then, the action adaptation circuit 207 executes processing designated by the action on each packet. For example, in a case where IP address conversion and transfer are designated by the action, the action adaptation circuit 207 converts a transmission source IP and instructs the X-bar switch 208 to perform transfer. Furthermore, in a case where an action of a dummy response is designated, the action adaptation circuit 207 instructs the X-bar switch 208 to perform transfer without executing the processing on the packet. In addition, in a case where an action instructs to discard a packet, the action adaptation circuit 207 notifies the discard of the packet of the X-bar switch 208.

In a case where the X-bar switch 208 receives the instruction to transfer the packet from the action adaptation circuit 207, the X-bar switch 208 adds the header and the label acquired from the action adaptation circuit 207 to the payload acquired from the classifier 202 and transfers the packet according to the label. For example, in a case where the label represents transmission of a packet to the virtual machine 112 in the same physical machine 11, the X-bar switch 208 outputs the packet to the VM interface 209. On the other hand, in a case where the label represents transmission of a packet to the virtual machine 121 or the like in the physical machine 12, the X-bar switch 208 outputs the packet to the physical interface 210.

The VM interface 209 receives an input of the packet to be transmitted to the virtual machine 112 from the X-bar switch 208. Then, the VM interface 209 transmits the acquired packet to the VM memory 114 and makes the VM memory 114 temporarily store the packet. Thereafter, the packet stored in the VM memory 114 is read by the virtual machine 112.

The physical interface 210 receives an input of the packet to be transmitted to an external device such as the physical machine 12 from the X-bar switch 208. Then, the physical interface 210 transmits the acquired packet to the router 13.

Figure 9:
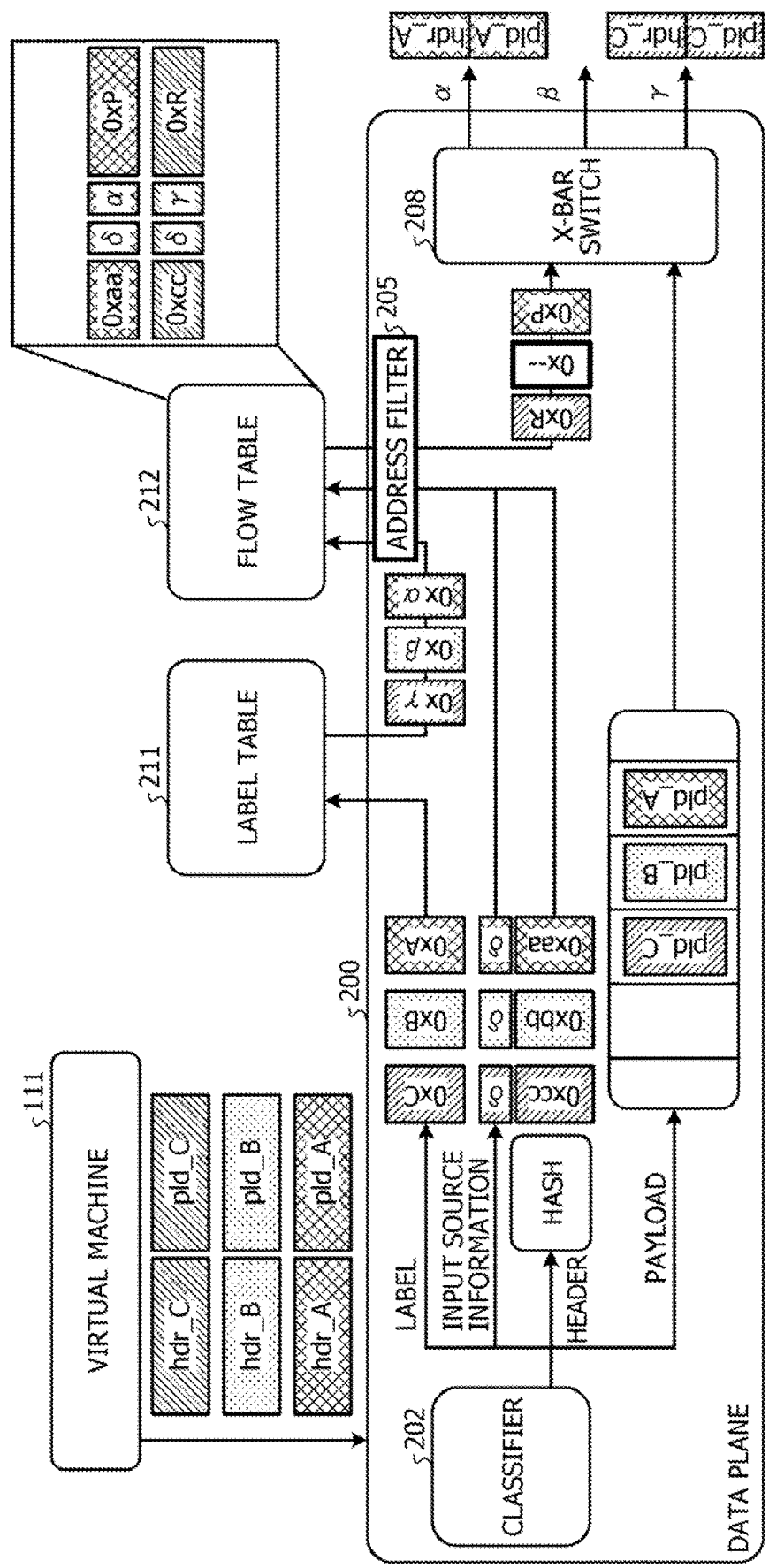
FIG. 9 is a diagram illustrating an outline of packet transfer by a data plane according to an embodiment.

FIG. 9 is a diagram illustrating an outline of packet transfer by a data plane according to the embodiment. Hereinafter, an overall flow of action execution in packet transfer by the data plane 200 will be summarized with reference to FIG. 9.

Here, the data plane 200 receives a packet of which a header is hdr_A and a payload is pld_p from the virtual machine 111. Next, the data plane 200 receives a packet of which a header is hdr_B and a payload is pld_B from the virtual machine 111. Next, the data plane 200 receives a packet of which a header is hdr_C and a payload is pld_C from the virtual machine 111.

The classifier 202 separates the packet of which the header is hdr_A and the payload is pld_A. In this case, the classifier 202 acquires 0xA as a label, δ as input source information, the header hdr_A, and the payload pld_A. Moreover, the classifier 202 performs hash calculation on the header hdr_A and acquires 0xaa as a hash value.

Similarly, regarding the packet of which the header is hdr_B and the payload is pld_B, the classifier 202 acquires 0xB as a label, δ as input source information, 0xbb as a hash value of the header hdr_B, and the payload pld_B. Furthermore, similarly, regarding the packet of which the header is hdr_C and the payload is pld_C, the classifier 202 acquires 0xC as a label, δ as input source information, 0xcc as a hash value of the header hdr_C, and the payload pld_C.

Next, the labels 0xA, 0xB, and 0xC are output from the classifier 202 and are respectively converted into 0xα, 0xβ, and 0xγ that are the pieces of the destination information according to the label table 211.

The address filter 205 acquires 0xα, 0xβ, and 0xγ as the destination information converted from the labels. Furthermore, the address filter 205 acquires δ as the input source information of each packet and acquires 0xaa, 0xbb, and 0xcc that are the hash values of the headers of the respective packets.

Then, the address filter 205 determines whether or not each packet satisfies a predetermined search unnecessary requirement. Here, a case will be described where the packet of which the destination information is 0xβ satisfies the search unnecessary requirement such that an IP address is not changed. In this case, the address filter 205 generates requests for an action inquiry for the packets of which the destination information is 0xα and 0xγ and inquires an action to be executed. Then, the address filter 205 acquires an action of address conversion for converting α into P from the flow table 212. Furthermore, the address filter 205 acquires an action of address conversion for converting β into R from the flow table 212. Moreover, the address filter 205 generates an action of a dummy response for the packet of which the destination information is 0xβ. In FIG. 9, the dummy response is illustrated as "0x-". Then, the processing designated as the action to be executed on each packet is executed on the label, the header, and the header output from the address filter 205, and the label and the header are input to the X-bar switch 208.

The X-bar switch 208 generates a packet by adding the header hdr_A on which the address conversion has been performed to the payload pld_A and outputs the packet to a destination indicated by the label α. Furthermore, the X-bar switch 208 generates a packet by adding the header hdr_B similar to that in the input state to the payload pld_B and outputs the packet to a destination indicated by the label β. Furthermore, the X-bar switch 208 generates a packet by adding the header hdr_C on which the address conversion has been performed to the payload pld_C and outputs the packet to a destination indicated by the label γ.

Figure 10:
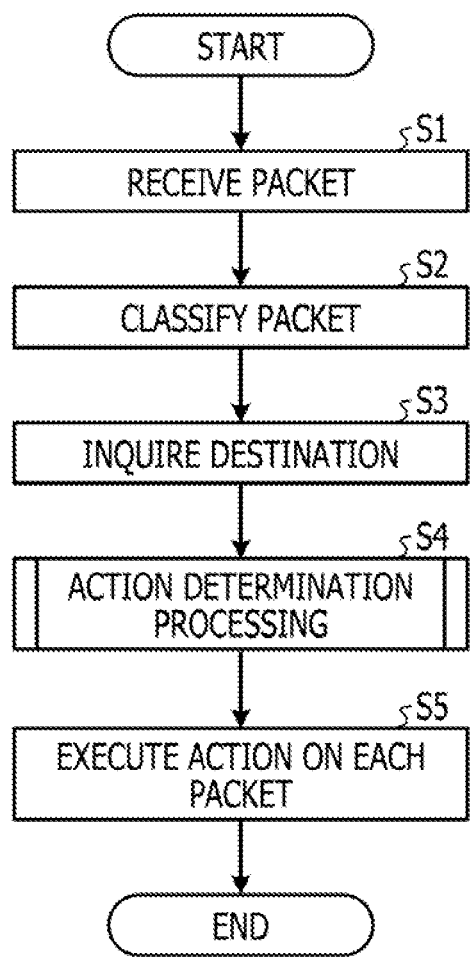
FIG. 10 is a flowchart of packet transfer processing by a virtual router according to the embodiment.

Next, a flow of packet transfer processing by the virtual router 110 according to the present embodiment will be described with reference to FIG. 10. FIG. 10 is a flowchart of packet transfer processing by a virtual router according to the embodiment.

The VM interface 201 acquires a packet transmitted from the virtual machine 111 and stored in the VM memory 113 (step S1).

The classifier 202 receives inputs of the packets from the VM interface 201. Then, the classifier 202 classifies the packet into a label, input source information, a header, and a payload (step S2). Next, the classifier 202 performs hash calculation on the header and calculates a hash value. Thereafter, the classifier 202 transmits the label to the requester 203 and outputs the input source information and the hash value of the header to the requester 204. Furthermore, the classifier 202 outputs the payload to the X-bar switch 208.

The requester 203 receives the input of the label from the classifier 202. Next, the requester 203 generates a request for a destination inquiry using the label. Then, the requester 203 outputs the request for the destination inquiry to the memory circuit 206 and inquires a destination (step S3). Thereafter, the memory circuit 206 refers to the label table 211 and acquires information regarding the destination corresponding to the label. The requester 203 receives an input of the destination information from the memory circuit 206 as a response to the request for the destination inquiry. Thereafter, the requester 203 outputs the acquired destination information to the requester 204.

The requester 204 receives inputs of the input source information and the hash value of the header from the classifier 202. Furthermore, the requester 204 receives an input of the destination information from the requester 203. Then, the requester 204 executes action determination processing for determining an action to the packet using the input source information, the destination information, and the hash value of the header (step S4). Details of the action determination processing will be described later in detail.

The requester 204 outputs the determined action to the action adaptation circuit 207 together with the label and the header. The action adaptation circuit 207 executes the determined action on the packet (step S Then, the action adaptation circuit 207 outputs the label and the header on which the action has been executed to the X-bar switch 208.

The X-bar switch 208 receives inputs of the label and the header on which the action has been executed from the requester 204. Furthermore, the X-bar switch 208 receives an input of the payload from the classifier 202. Then, the X-bar switch 208 generates a packet by adding the header to the payload, outputs the packet to the VM interface 201 or the physical interface 210 according to the label, and transmits the packet to a transmission destination indicated by the label (step S6).

Figure 11:
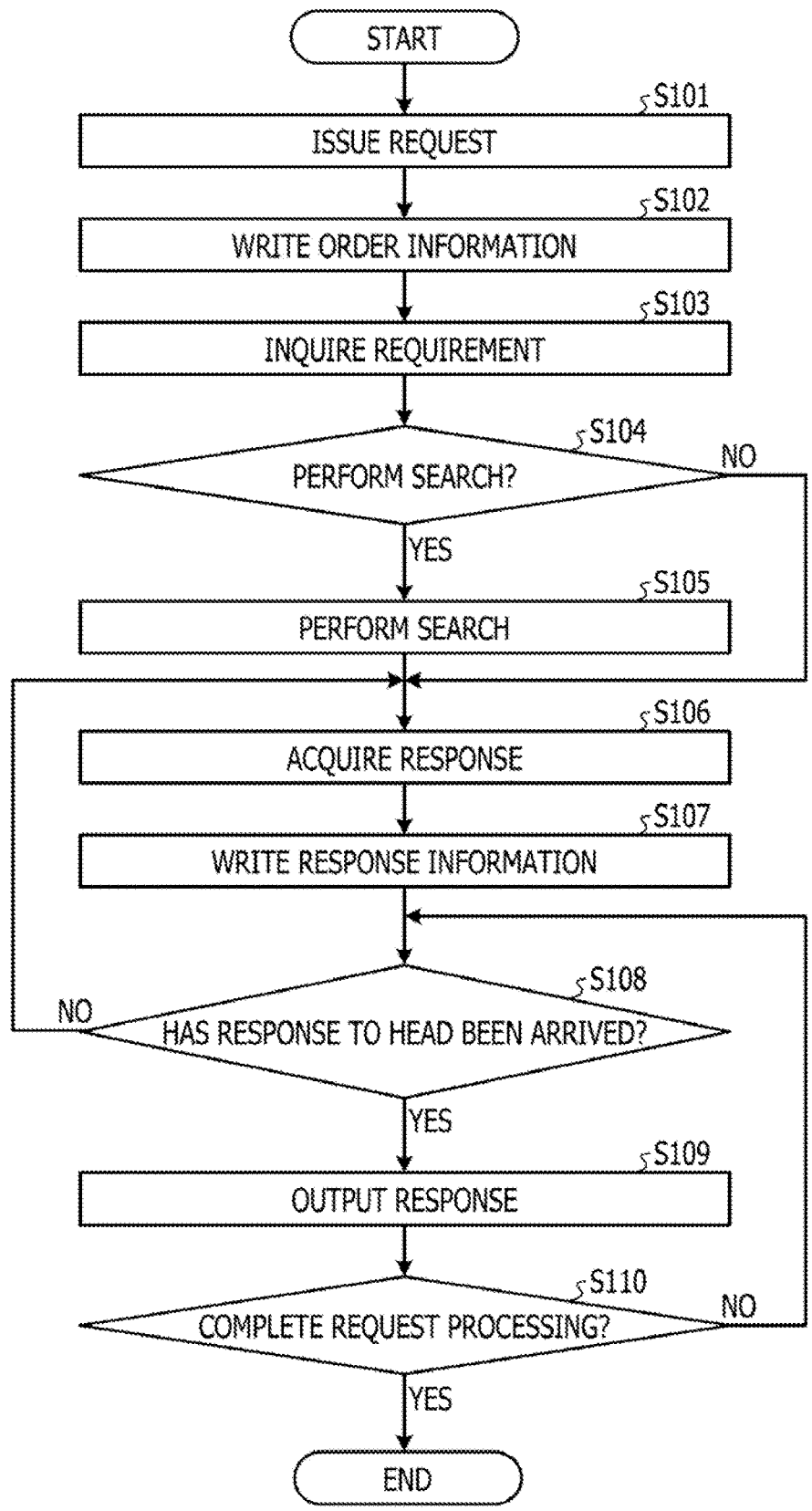
FIG. 11 is a flowchart of action determination processing by the data plane according to the embodiment.

Next, a flow of action determination processing by the data plane 200 according to the present embodiment will be described with reference to FIG. 11. FIG. 11 is a flowchart of action determination processing by a data plane according to the embodiment. Each processing illustrated in the flow in FIG. 11 corresponds to an example of the processing executed in step S4 in FIG. 10.

The requester 204 issues a request for an action inquiry to the determination unit 252 of the address filter 205 (step S101).

The determination unit 252 receives an input of the request for the action inquiry from the requester 204. Next, the determination unit 252 writes order information to the order control unit 253 (step S102).

Next, the determination unit 252 inquires a requirement to the storage unit 251 and acquires the requirement and the determination information from the storage unit 251 (step S103).

Next, the determination unit 252 determines whether or not to search for an action from the information regarding the transmission source, the destination information, or the like included in the request using the acquired requirement and determination information (step S104), In a case where the action is not searched (step S104: No), the action determination processing proceeds to step S106.

On the other hand, in a case where search is performed (step S104: Yes), the determination unit 252 outputs the request to the memory circuit 206. The memory circuit 206 searches the flow table 212 using the information regarding the transmission source, the destination information, and the hash value of the header included in the acquired request and acquires the corresponding action (step S105).

The determination unit 252 acquires information regarding an action to be executed on the packet as a response to the request. Furthermore, in a case where the action is not searched, the determination unit 252 acquires a response designated by the requirement (step S106).

Then, the determination unit 252 writes response information to the order control unit 253 (step S107).

The order control unit 253 determines whether or not a response corresponding to a head packet of the order information has been arrived (step S108). In a case where the response corresponding to the head packet is not arrived (step S108: No), the action determination processing returns to step S106.

On the other hand, in a case where the response corresponding to the head packet has been arrived (step S108: Yes), the order control unit 253 outputs the response to the requester 204 (step S109).

The requester 204 receives an input of the response to the request for the action inquiry from the order control unit 253 of the address filter 205. Then, the requester 204 outputs information regarding the action designated for each packet to the action adaptation circuit 207. The order control unit 253 of the address filter 205 determines whether or not all the requests have been processed (step S110). In a case where an unprocessed request remains (step S110: No), the action determination processing returns to step S108.

On the other hand, in a case where all the requests have been processed (step S110: Yes), the address filter 205 ends the action determination processing.

As described above, the virtual router according to the present embodiment creates the response information from the requirements without searching for an action for the packet that satisfies the requirements by checking the predetermined requirements in a case where the request for the action inquiry is received and responds together with the search results in an order. As a result, it is possible to suppress the number of times of memory access caused by the action search, and it is possible to reduce a load on the memory circuit.

Here, an FPGA onboard memory is vulnerable to random access, and search tends to be a bottleneck of the entire virtual router. On the other hand, the virtual router according to the present embodiment can improve a usage efficiency of an order-controllable memory bus by shortening a search time that is the bottleneck of the memory bus by reducing the number of times of memory access and can improve a routing performance.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. An information processing device comprising:
a memory;
a network interface circuit; and
hardware processor circuitry coupled to the memory and the network interface circuit, the hardware processor circuity being configured to perform processing of a virtual router, the processing of the virtual router including:
operating the hardware processor circuitry as a memory circuit configured to search for information stored in the memory;
operating the hardware processor circuitry as a requester, the requester being configured to issue a plurality of requests for search to the memory circuit, the issuing of the plurality of requests including issuing, in response to receiving packet information with respect to a packet received from an external device, a request for an action search to inquire information regarding the action to be executed on each packet, each of the plurality of requests being a request for the action search and including the packet information with respect to the packet; and operating the hardware processor circuitry as a controller coupled to the memory circuit and the requester, the controller being configured to:

receive, as an input, each request of the plurality of requests issued from the requester, in response to the receiving of the request, store order information indicating an input order of the received request among the plurality of requests, determine whether to make the memory circuit perform the action search using the request, the determining including determining that the memory circuit is not made to perform the action search using the request in a case where the packet information included in the received request satisfies a predetermined requirement and determining that the memory circuit is made to perform the action search using the request in a case where the packet information included in the received request does not satisfy a predetermined requirement, the predetermined requirement including a requirement to identify the packet for which the action search is unnecessary, in response to the determining that the memory circuit is not made to perform the action search using the request:

create a predetermined response that is a dummy response including a predetermined value, and return, as a response of the memory circuit for the request, the predetermined response for the request to the requester at timing corresponding to the input order of the request among the plurality of requests, based on the order information, and in response to the determining that the memory circuit is made to perform the action search using the request:

obtain a response from the memory circuit by causing the memory circuit to perform the action search using the request for the action search, and return, as the response of the memory circuit for the request, the response obtained from the memory circuit to the requester at timing corresponding to the input order of the request among the plurality of requests, based on the order information.

2. The information processing device according to claim 1, the controller being further configured to:

execute a storage processing that stores the predetermined requirement; and in a case where the determination result obtained by the determining indicates that the memory circuit is made to perform search, output the request to the memory circuit, in response to the outputting of the request, acquire a response from the memory circuit, and return the responses to the requester in the input order based on the order information.

3. The information processing device according to claim 2, wherein the memory includes specific information that specifies processing to be executed on a packet received from an external device, the requester generates the request to inquire the processing to be executed on the packet, the determination processing creates the predetermined response that represents the processing to be executed on the packet or transmits the request to the memory circuit, the memory circuit receives the inquiry according to the request, searches for the processing to be executed on the packet on the basis of the specific information, and responds to the order control processing, and the processing of the virtual router further comprises:

operating the hardware processor circuitry as an action adaptation circuit configured to acquire the response of the memory circuit or the predetermined response from the requester, execute, on the packet, processing designated by the response of the memory circuit or the predetermined response, and transmit the packet on which having executed the processing designated by the response of the memory circuit or the predetermined response.

4. An information processing method implemented by a computer, the computer including a memory, a network interface circuit, and hardware processor circuitry coupled to the memory and the network interface circuit, the hardware processor circuitry being configured to perform processing of a virtual router, the information processing method comprising:

operating, by the computer, the hardware processor circuitry as a memory circuit configured to search for information stored in the memory;

operating, by the computer, the hardware processor circuitry as a requester, the requester being configured to issue a plurality of requests for search to the memory circuit, the issuing of the plurality of requests including issuing, in response to receiving packet information with respect to a packet received from an external device, a request for an action search to inquire information regarding the action to be executed on each packet, each of the plurality of requests being a request for the action search and including the packet information with respect to the packet; and operating, by the computer, the hardware processor circuitry as a controller coupled to the memory circuit and the requester, the controller being configured to perform processing including:

receiving, as an input, each request of the plurality of requests issued from the requester, in response to the receiving of the request, storing order information indicating an input order of the received request among the plurality of requests, determining whether to make the memory circuit perform the action search using the request, the determining including determining that the memory circuit is not made to perform the action search using the request in a case where the packet information included in the received request satisfies a predetermined requirement and determining that the memory circuit is made to perform the action search using the request in a case where the packet information included in the received request does not satisfy a predetermined requirement, the predetermined requirement including a requirement to identify the packet for which the action search is unnecessary, in response to the determining that the memory circuit is not made to perform the action search using the request:

creating a predetermined response that is a dummy response including a predetermined value, and returning, as a response of the memory circuit for the request, the predetermined response for the request to the requester at timing corresponding to the input order of the request among the plurality of requests, based on the order information, and in response to the determining that the memory circuit is made to perform the action search using the request:
  obtain a response from the memory circuit by causing the memory circuit to perform the action search using the request for the action search, and
  return, as the response of the memory circuit for the request, the response obtained from the memory circuit to the requester at timing corresponding to the input order of the request among the plurality of requests, based on the order information.

5. A non-transitory computer-readable recording medium storing an information processing program for causing a computer to execute processing of a virtual router, the computer including a memory, a network interface circuit, and hardware processor circuitry coupled to the memory and the network interface circuit, the processing comprising:
  operating, by the computer, the hardware processor circuitry as a memory circuit configured to search for information stored in the memory;
  operating, by the computer, the hardware processor circuitry as a requester, the requester being configured to issue a plurality of requests for search to the memory circuit, the issuing of the plurality of requests including issuing, in response to receiving packet information with respect to a packet received from an external device, a request for an action search to inquire information regarding the action to be executed on each packet, each of the plurality of requests being a request for the action search and including the packet information with respect to the packet; and
  operating, by the computer, the hardware processor circuitry as a controller coupled to the memory circuit and the requester, the controller being configured to perform processing including:
  receiving, as an input, each request of the plurality of requests issued from the requester, in response to the receiving of the request, storing order information indicating an input order of the received request among the plurality of requests, determining whether to make the memory circuit perform the action search using the request, the determining including determining that the memory circuit is not made to perform the action search using the request in a case where the packet information included in the received request satisfies a predetermined requirement and determining that the memory circuit is made to perform the action search using the request in a case where the packet information included in the received request does not satisfy a predetermined requirement, the predetermined requirement including a requirement to identify the packet for which the action search is unnecessary, in response to the determining that the memory circuit is not made to perform the action search using the request:
  creating a predetermined response that is a dummy response including a predetermined value, and
  returning, as a response of the memory circuit for the request, the predetermined response for the request to the requester at timing corresponding to the input order of the request among the plurality of requests, based on the order information, and in response to the determining that the memory circuit is made to perform the action search using the request:
  obtain a response from the memory circuit by causing the memory circuit to perform the action search using the request for the action search, and
  return, as the response of the memory circuit for the request, the response obtained from the memory circuit to the requester at timing corresponding to the input order of the request among the plurality of requests, based on the order information.

* * * * *